Nov. 24, 1936.  J. SINKO  2,061,811

MOUNTING PLUG

Filed Dec. 12, 1934

Inventor:
John Sinko.
By George E. Mueller
Atty.

Patented Nov. 24, 1936

2,061,811

UNITED STATES PATENT OFFICE 2,061,811

MOUNTING PLUG

John Sinko, Chicago, Ill.

Application December 12, 1934, Serial No. 757,190

3 Claims. (Cl. 287—53)

My invention relates in general to an expanding mounting, and more in particular to a resilient expanding mounting plug for insertion in a hollow knob to mount the knob on a threaded stub shaft, bolt or the like.

At the present time, knobs of glass or composition material are used almost universally on the top of gear shift levers on automobiles. The knobs are ordinarily screwed onto a threaded stub or shank on the top of the lever. The threads on the knob sometimes become stripped, which requires an entirely new knob. In other cases it is desired to substitute a novelty knob on the gear shift lever, which either is not threaded to screw onto the lever, or is of such a size that it will not fit the threaded stub of the lever in question. The same difficulty is encountered in the use of other types of knobs, for drawers, doors and the like, which may be constructed of wood, glass, metal or any other material. Either the knob can not originally be mounted on the necessary bolt or shaft, or it is pulled from the bolt and can not again be secured to the same.

It is an object of my invention to provide an improved expanding joint for connecting two members together by frictional engagement of the joint on the members.

A further object is to provide such a joint in the form of a resilient mounting plug for knobs.

A still further object is to provide such a plug with an irregular yielding outside surface to fit within the mounting socket of a knob and frictionally engage the wall of the socket.

It is also an object to provide such a plug with a central cavity to receive a threaded stub shaft, bolt or the like, whereby to mount the knob on such a member by means of the plug.

One of the features of my mounting plug is the provision of a yielding outside surface which will adapt itself to a socket in a knob, and the provision of vertical channels on said surface to permit the escape of air around the plug as it is inserted into the knob socket permitting complete and rapid insertion into said socket.

Other objects and features of my invention will be apparent from the following description taken with the drawing in which.

In practicing my invention I provide an expanding joint or mounting for connecting two members together, in which one of said members has a socket therein, and the other terminates in a stub shaft smaller than said socket. The mounting comprises a resilient plug, preferably of rubber, having a yielding surface for frictionally engaging the wall of the socket of one member upon insertion of the plug in said socket, and having a cavity centrally thereof to receive a stub shaft as the second member, with the wall of the cavity frictionally engaging the outer surface of the stub shaft to connect the two members together.

Figure 3:
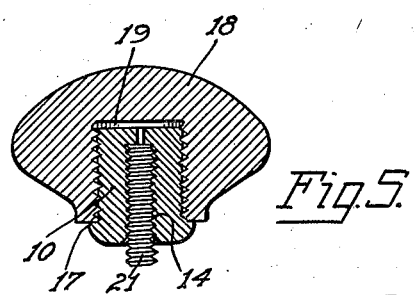
Fig. 3 is a top plan view of the plug of Fig. 1.
Figure 4:
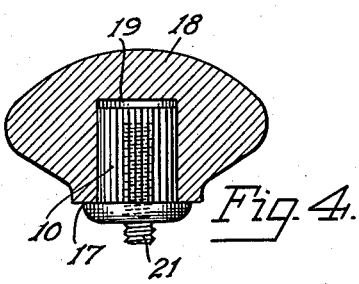
Fig. 4 is a side elevation partly in section illustrating the plug positioned within a knob and carrying a threaded shaft.
Figure 5:
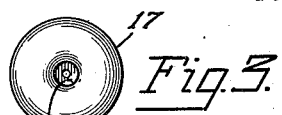
Fig. 5 is a sectional view of the entire assembly.
Figure 1:
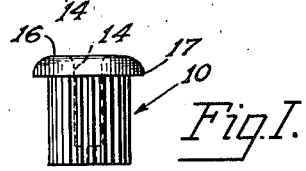
Fig. 1 is a side elevation of the expanding mounting plug of my invention.
Figure 2:
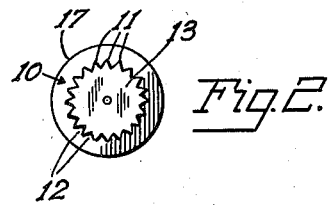
Fig. 2 is a bottom view of the plug.

Referring now to the drawing, Figs. 1 to 5 illustrate the mounting plug having a body portion 10 with a plurality of vertically extending ribs 11 on the outside thereof. As stated, the plug preferably is provided in an all rubber structure, but it is understood that composition materials with the same general characteristics may be employed. The ribs 11 form intervening channels 12 also extending from the bottom to the top of the body portion. The bottom 13 of the plug is closed as shown in Fig. 2, while a cavity 14 is provided centrally of the body portion opening from the top 16 thereof. An integral collar tops the body portion with an annular flange 17 to limit the insertion of the plug within a knob as will be hereinafter explained.

As previously explained, the need for an expanding joint arises particularly where it is desired to insert a shaft of one member into a corresponding cavity of another member, and one or the other is of such size that they cannot be secured together by ordinary direct engagement. I have illustrated this condition in Figs. 4 and 5, where it is desired to mount a knob 18 having a socket 19 on a threaded shaft 21. The latter is considerably smaller in diameter than the inside diameter of the socket 19. Threads are shown on the inside of the socket 19 although it is understood that the mounting plug will operate equally well in a smooth wall socket.

In the use of my invention the mounting plug is pushed into the socket 19 of the knob 18. The body portion is very slightly larger than the socket, and during this operation the ribs 11 yield sufficiently to permit the ready insertion of the plug without at the same time tearing so as to reduce the effective bulk of the device. This assembly is facilitated by the channels 12 of which the greater proportion, at least, remain open to permit air to escape from the socket as the plug is pushed inwardly. The plug may be pushed into the socket until the flange 17 rests upon the edge of the opening. The knob and plug assembly may then be mounted on the shaft 21 by pushing them together to the depth of the cavity 14 or the assembly may be screwed on. The cavity 14 itself is designed to be slightly smaller than the corresponding member upon which it is mounted, but has a tapered mouth to initially receive the shaft after which the walls are pushed outwardly slightly as the shaft is inserted to provide a tighter connection between the knob and plug, and consequently between the knob and shaft. The bottom of the cavity 14 is closed as described to limit the insertion of the shaft. If the shaft is pressed against this bottom and the plug is not resting against the flange 17, further movement will press the plug to this flange. The closed bottom also prevents the shaft from continuing through the cavity 14 to engage the bottom of the socket 19 and perhaps force the plug from said socket.

Although I have described my invention as applied to a mounting for a knob to support the knob on a lever, bolt or the like, it is understood that it may also be used as a joint between any two objects in which one object has an enlarged socket and the other a smaller stub shaft to support the first object on said shaft.

Furthermore, although I have described my invention in its preferred embodiment, it is understood that I am not limited thereby, but limit the invention only by the scope of the appended claims.

I claim:

1. In a combination of the character described, a knob having a threaded socket therein, a separate shaft, and an intermediate mounting plug open at one end and fitting snugly within said threaded socket, said plug having yieldable ribs on the outside surface thereof for yieldingly and frictionally engaging the internally threaded socket of the knob, with said plug fitting over the end of said shaft to support the knob on the shaft.

2. In a combination of the character described, a knob having a threaded socket therein, a separate threaded shaft, and an intermediate mounting plug open at one end and fitting snugly within said socket, said plug having an outer ribbed surface for yieldingly and frictionally engaging the threaded socket of the knob, with said plug fitting over the top of said threaded shaft and frictionally retained thereon to support the knob on the shaft.

3. In a combination of the character described, a knob having a separate shaft, and an intermediate mounting plug open at one end and fitting snugly within said threaded socket and having an annular flange at said open end around said opening for engaging the knob around said socket to limit the insertion of said plug in said socket, said plug having longitudinally extending ribs on the outside surface for engagement with the threads of the socket of the knob, with said plug fitting over the top of said threaded shaft to support the knob on the shaft.

JOHN SINKO.